UNITED STATES PATENT OFFICE.

GEORGE ESCOL SELLERS, OF HARDIN COUNTY, ILLINOIS.

DISINTEGRATION OF VEGETABLE SUBSTANCES FOR THE SEPARATION OF FIBER, &c.

Specification forming part of Letters Patent No. 40,576, dated November 10, 1863.

*To all whom it may concern:*

Be it known that I, GEORGE ESCOL SELLERS, of Hardin county, in the State of Illinois, have invented certain Improvements in the Mode of Disintegrating Vegetable Substances; and I do hereby declare the following to be a full and exact description thereof.

The object of my invention is the disintegration of vegetable substances—such as the cane, (*Arundinaria macrosperma*,) sugar-cane, reed, straw, grasses, hemp, flax, or woods—and the separation of their fibrous from the nonfibrous portions, so as to fit them for paperstock or other purposes for which they are adapted by a process of steaming or steamwashing, combined with well-known mechanical operations, in a cheaper and more thorough manner than has heretofore been done.

The nature of my invention consists in driving off from such vegetable substances portions of the sap and other easily-volatilized matter by a current of steam, and afterward, by an increase of heat, coagulating the nonfibrous cementing portions that remain, finally crushing by passing between rollers or tearing to pieces by any well-known mechanical device—such, for instance, as the common beating or washing engine used by paper-makers—and washing out the coagulated portions, which are now in fine particles, and preserving the same in a condition applicable to the arts, leaving the fiber comparatively free and clean, so as to require but a small amount of caustic alkali or other chemical agencies to entirely free it and prepare it for bleaching.

In order to render the process clear to any practical mechanic or paper-maker, I will describe the process as I use it for cane, the same being applicable to any other vegetable substance containing fiber.

I take the cane fresh cut and place it in an iron cylinder or boiler, such as is used by paper-makers for boiling straw or rags. After closing this cylinder or boiler I admit steam from an ordinary steam-boiler, which steam I allow to pass through the boiler containing the cane until the cane has been heated to the temperature of the steam for some time. This steaming or steam-washing process carries off the volatile portions of the sap, producing a strong smell, like that of burnt sugar, and removes portions of the plant that are difficult to bleach. The steam that escapes through the cane-boiler I use for heating wash-water, alkali-boiling, or any other purpose in the mill requiring heat. After the steam-washing has continued for a sufficient length of time, which time experience soon teaches, and which varies according to the state of the cane under treatment, I close the escape-valve and allow it to remain under an increased heat and pressure a sufficient time to coagulate the nonfibrous cementing-matter contained in the cane. The same thing can be effected without closing the escape-valve by using higher or more heated steam for the washing. Care must be taken not to use steam of so high a temperature as to weaken or destroy the fiber by burning. I find in practice that ripe cane cut in the fall months, full of sap, is completely softened and its non-fibrous matter coagulated by an exposure of one hour to steam of one hundred pounds pressure to the square inch, or 332° of temperature. The same effect is produced by steam of two hundred pounds pressure or 387° of temperature in about fifteen minutes; but the color of the product is darker, and when continued for too long a period portions become charred, causing black specks among the fibers. When the cylinders are opened the cane is in a soft, almost pulpy state, and cannot easily be handled without falling to pieces. In this state I pass it between rollers and thoroughly crush it. I then wash out the coagulated cementing-matter in the common washing-engine, from which it flows into settling-vats. After settling I draw off the water, leaving the non-fibrous matter in a pasty state. This I use to mix with such kinds of paper-stock as require foreign substances to increase their hardness or density. I also use it combined with fiber in the production of press and box boards. It is an article well adapted for molding into ornamental work such as putty, papier-maché, or plaster are used for and to which I have given the name of "Arundine," as cane furnishes the same in a larger proportion than any other vegetable substance I have used. After treating the cane in the manner described there may still remain some of the cementing or nonfibrous portions of the plant mixed with the fiber. These I remove by boiling in a weak solution of caustic alkali, or wash out with hot water, or render soluble before washing by soaking in a weak aqueous solution of chlorine, and then bleach in the usual manner.

In the above description I have referred to green cane, fresh cut, as I prefer it in this state; but dry cane, wood, straw, flax, or other vegetable substances containing fiber can be successfully operated upon by the same process.

I am aware that there is no novelty in boiling or steaming vegetable substances in alkaline or other solutions, but all such processes have heretofore been for the purpose of dissolving the substances that cement the fibers together, and have been more prolonged and much more expensive than my process, which, instead of dissolving the non-fibrous matters, carries off their most volatile portions by steam-washing, and coagulates by heat the remainder into a substance distinct from the fibers and in a condition to be easily separated therefrom by crushing or tearing to pieces and washing, and in this state applicable to the arts, or, when dry, may be dusted out from the mass of the fiber, so that what little of the cementing-matter remains is removed by boiling with a much smaller portion of alkali or other less expensive methods than would have been required had not my process been first used.

Having thus described my invention as to its object, nature, and theory of operation, what I claim as new, and desire to secure by Letters Patent, is—

1. The disintegration of vegetable substances in the manner substantially as described, and for the purposes specified.

2. The utilizing of the non-fibrous portions of vegetable substances, when separated from the fibrous portions, for the purposes specified.

GEO. ESCOL SELLERS.

Witnesses:
  PHILIP M. PRICE,
  WILLIAMS OGLE.